United States Patent
Lorenzen et al.

(10) Patent No.: US 6,188,759 B1
(45) Date of Patent: Feb. 13, 2001

(54) METHOD AND APPARATUS OF PROCESSING A CALL IN A TELECOMMUNICATIONS NETWORK

(75) Inventors: Jeanene M. Lorenzen; Charles M. Homola, both of Allen; Paul M. Bray, Garland; Bernard J. Gerault, Frisco; Meanhuy S. Chen, Plano; Kevin E. Canady, Garland, all of TX (US)

(73) Assignee: Alcatel USA Sourcing, L.P., Plano, TX (US)

( * ) Notice: Under 35 U.S.C. 154(b), the term of this patent shall be extended for 0 days.

(21) Appl. No.: 09/006,272

(22) Filed: Jan. 13, 1998

Related U.S. Application Data

(60) Provisional application No. 60/035,089, filed on Jan. 13, 1997.

(51) Int. Cl.[7] .................................................. H04M 7/00
(52) U.S. Cl. ........................... 379/220; 379/221; 379/229
(58) Field of Search .................................... 379/220, 221, 379/219, 224, 225, 229, 230, 231, 232, 242, 207

(56) References Cited

U.S. PATENT DOCUMENTS

| | | | |
|---|---|---|---|
| 4,284,852 | 8/1981 | Szybicki et al. | 379/221 |
| 5,526,414 | 6/1996 | Bédard et al. | 379/221 |
| 5,615,254 | * 3/1997 | Qiu et al. | 379/220 |
| 5,838,769 | * 11/1998 | McNeil et al. | 379/220 |

FOREIGN PATENT DOCUMENTS

| | | | |
|---|---|---|---|
| 0372270 | 6/1990 | (EP) | H04Q/3/00 |
| 9613945 | 5/1996 | (WO) | H04Q/3/66 |

OTHER PUBLICATIONS

J. Regnier, et al., "Dynamically Controlled Routing in Networks with Non–DCR–Compliant Switches", IEEE Communications Magazine, vol. 33, No. 7, Jul. 1995, pp. 48–52.

B.R. Hurley, et al., "A Survey of Dynamic Routing Methods for Circuit–Switched Traffic", IEEE Communications Magazine, vol. 25, No. 9, Sep. 1987, pp. 13–21.

H. Cameron, et al., "Dynamically Controlled Routing", Telesis, 1986, Ottawa, Canada, pp. 33–37.

* cited by examiner

Primary Examiner—Krista Zele
Assistant Examiner—Benny Q. Tieu
(74) Attorney, Agent, or Firm—Baker Botts L.L.P.

(57) ABSTRACT

A telecommunications network (10) includes a network processor (16) and a plurality of telecommunications switches (12). Each of the plurality of telecommunications switches (12) receives routing recommendations from the network processor (16) based on congestion data supplied by each of the plurality of telecommunications switches (12) to the network processor (16). Congestion data is collected and supplied for each of the plurality of processors (14) within each of the plurality of telecommunications switches (12) within the telecommunications network (10). Each of the plurality of processors (14) routes telecommunications signals within the telecommunications network (10) according to routing recommendations stored in destination node tables (30) as provided by the network processor (16). The network processor (16) continuously updates the routing recommendations within the destination node tables (30) according to changes in congestion states or configuration states of the telecommunications network (10).

8 Claims, 5 Drawing Sheets ns network.

METHOD AND APPARATUS OF PROCESSING A CALL IN A TELECOMMUNICATIONS NETWORK

CROSS REFERENCE TO RELATED APPLICATIONS

This application claims the benefit of U.S. Provisional Application No. 60/035,089 filed on Jan. 13, 1997.

TECHNICAL FIELD OF THE INVENTION

The present invention relates in general to telecommunications signal processing and more particularly to a method of routing telecommunications signals in a telecommunications network.

BACKGROUND OF THE INVENTION

Telecommunications switches are used to route telecommunication traffic through a telecommunication network. The telecommunication switches use routing tables to determine where the telecommunication traffic is to be transferred. Many of these routing tables are static in nature and extremely difficult to update and change. Even those routing tables which might be dynamically updated only provide routing information for the telecommunication switch with which it is associated. However, routing determinations may be performed by any of a number of processors within the telecommunications switch. Therefore, it is desirable to dynamically provide routing information to each of a plurality of processors within a telecommunications switch.

SUMMARY OF THE INVENTION

From the foregoing, it may be appreciated that a need has arisen for a telecommunication switch that can provide routing of telecommunications signals as dynamically controlled by a network processor. In accordance with the present invention, a method of routing telecommunication signals in a telecommunications network is provided that substantially eliminates or reduces disadvantages and problems of fixed routing techniques in conventional telecommunications switches.

According to an embodiment of the present invention, there is provided a method of routing telecommunication signals in a telecommunications network that includes receiving a plurality of dynamic routing recommendations. A determination is made that telecommunications signals are to be transferred from a first switching element to a second switching element, possibly through one or more intermediate switching elements. One of the plurality of dynamic routing recommendations are identified to perform the transfer. The telecommunications signals are then transferred from the first switching element to the second switching element in response to the identified dynamic routing recommendation.

The present invention provides various technical advantages over conventional fixed routing techniques. For example, one technical advantage is due collect congestion data from processors within a telecommunications switch and generate routing recommendations based on the congestion state of the telecommunications switch. Another technical advantage is to provide routing recommendations to a telecommunications switch that can be dynamically changed in response to the congestion state of the telecommunications network. Other technical advantages may be readily apparent to those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
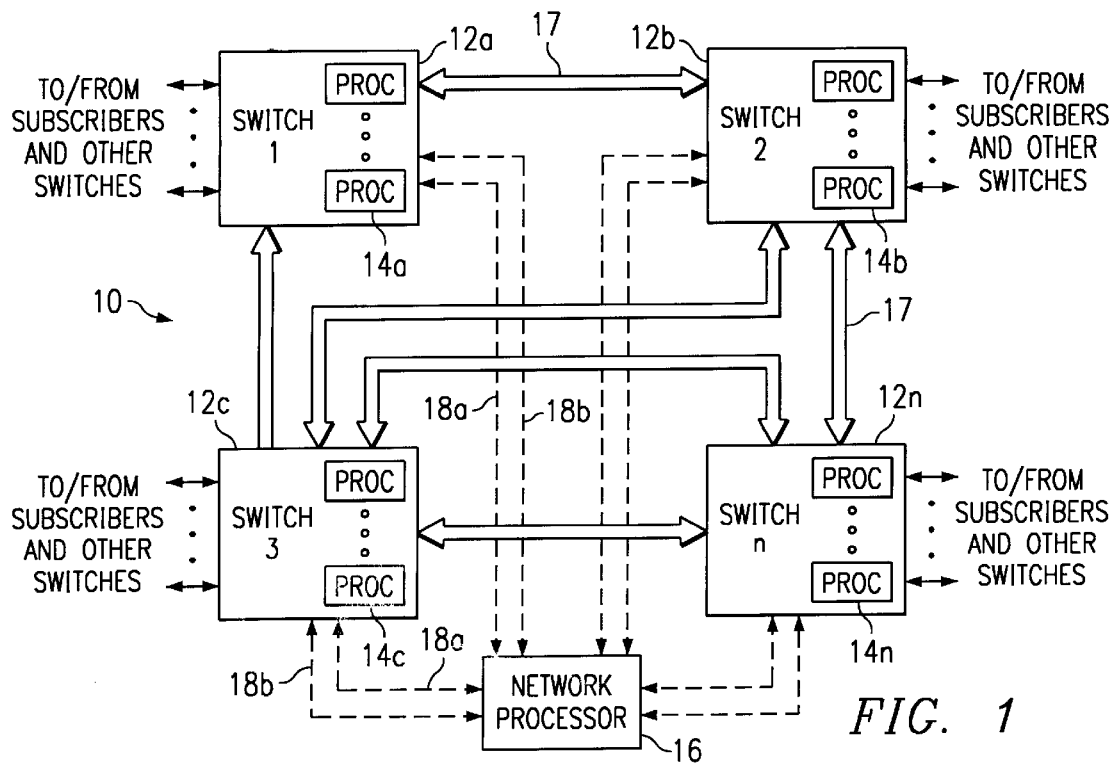
FIG. 1 is a block diagram of a telecommunications network 10.

FIG. 1 is a block diagram of a telecommunications network 10. Telecommunications network 10 includes a plurality of telecommunication switches 12a–n connected in a network configuration to transport telecommunications information. Each telecommunications switch 12 provides telecommunications information between local subscribers serviced by the telecommunications switch 12 and between local and remote subscribers through interaction with other telecommunication switches 12. Each telecommunications switch 12 includes a set of processors 14 to control transportation of telecommunications information to and from subscribers and other switching elements. The processing and control of telecommunications network 10 is distributed among the plurality of telecommunication switches 12 through each set of processors 14. A network processor 16 communicates with all telecommunication switches 12 within telecommunications network 10 through corresponding processors 14.

Network processor 16 communicates periodically with each telecommunications switch 12 within telecommunications network 10 to collect various switch and network information and respond with routing recommendations. Network processor 16 implements a dynamically controlled routing feature in order to optimize usage of inter machine trunks 17 between telecommunication switches 12, increase the call completion rate within telecommunications network 10, and optimize utilization of telecommunications switches 12. Network processor 16 provides each telecommunications switch 12 with routing protocols to dynamically change the routing of telecommunications information within telecommunications network 10 in response to various factors, including congestion points and equipment operation.

Each telecommunications switch 12 is connected to network processor 16 with fully redundant data links 18a and 18b. Redundant data links 18a and 18b are dedicated point-to-point connections. Redundant data link 18b is provided as a backup in case redundant data link 18a fails. Network processor 16 selects one of redundant data links 18a and 18b as the active link. The active link is the link used by network processor 16 for priming telecommunications switches 12 into dynamically controlled routing operation and exchanging recommendation and congestion data with telecommunication switches 12. The link not selected as the active link is established as a standby link. Network processor 16 establishes the active link first before establishing the standby link.

Telecommunications switch 12 may initiate link transfer over from the active link to the standby link upon an indication that there is a communication failure between telecommunications switch 12 and network processor 16 in the active link. Telecommunications switch 12 transfers over to the standby link and resumes dynamically controlled routing operation, with the standby link becoming the new active link. Messages received on the former active link after transfer over has occurred are to be discarded and flagged as an error condition. Telecommunications switch 12 will also transfer over the link if it detects that network processor 16 is sending recommendation data on the standby link. Telecommunications switch 12 will not transfer over the link if it does not receive a recommendation or problems occur in the communications between telecommunications switch 12 and network processor 16 for a specified number of update cycles, telecommunications switch 12 is unable to encode or decode a message, or congestion data has not been transmitted to network processor 16 for a specified number of update cycles. In these instances, telecommunications switch 12 will revert to a switch based fix routing mode.

At predefined intervals, each processor 14 within telecommunication switches 12, or network processor 16 in response to information received from each processor 14, determines an up to date picture of the in service trunks and a realistic figure of the global load on processors 14. This determination produces a switch occupancy index for each set of processors 14 and corresponding telecommunications switch 12 within telecommunications network 10. This switch occupancy index is the ratio of the new call arrival rate to the maximum call arrival rate for a dynamically controlled routing processing cycle. The switch occupancy index provides an indication of processor utilization to prevent overloads and congestion at telecommunication switches 12. The switch occupancy index takes into account and compensates for external factors that may interfere with the peak switch call handling capability.

Dynamically controlled routing (DCR) is a mode of operation within each telecommunications switch 12 that enhances the efficiency of telecommunications network 10. Efficiency is enhanced by producing most likely to succeed tandem route recommendations for switch destinations one or two links away from an originating telecommunications switch 12 for a subgroup of all switches in telecommunications network 10. The tandem route recommendations are computed by network processor 16. At regular time intervals, each telecommunications switch 12 operating in a dynamically controlled routing mode sends its idle trunk, trunk overflow counts, and other measurements to network processor 16. Network processor 16 then computes a recommendation for any call destined for any telecommunications switch 12 within telecommunications network 10. Network processor 16 can determine whether the call can be tandemly routed among telecommunication switches 12, conventionally switch based fix routed, or blocked.

Telecommunications switch 12 is considered a DCR switch when operating in a dynamically controlled routing mode, otherwise it will be a fix routed (FR) switch. Dynamically controlled routing occurs when linked switches in the transmission path are both operating in a DCR mode. Dynamically controlled routing assumes flexible routing within telecommunications network 10. A call can be tandem routed through any telecommunications switch 12 operating in a dynamically controlled routing mode, independently of standard fixed routing rules. Dynamically controlled routing is based on a central network processor 16 that keeps a congestion map of telecommunications network 10. By being in constant communication with all telecommunication switches 12 operating in a dynamically controlled routing mode within telecommunications network 10, network processor 16 can keep this map constantly updated.

Dynamically controlled routing follows three basic principles. First, if on an originating call the direct routes to a destination DCR switch one link away are busy, the call will attempt the tandem routes recommended by network processor 16 found within a destination node table of the originating DCR switch. Second, if a telecommunications switch 12 operating in a DCR mode is used as a tandem in a dynamically controlled routing call, then the direct routes to the destination DCR switch are attempted first. If direct routes are unavailable, then subsequent tandem routes are ignored and alternate fixed routes are attempted before the call is blocked to avoid looping within the dynamically controlled routing environment. Third, if a call originates in a telecommunications switch 12 operating in a DCR mode and the destination switch is more than two links away, then the call is switch based fix routed until it is within two links of the destination DCR switch and then dynamically control routed on the final two links.

There are three types of dynamically controlled routing calls—Handicap Zero, Handicap One, and Handicap Two. The classification of each is dependent on the number of legs between the originating DCR switch and the destination DCR switch. For a Handicap Zero call, the destination DCR switch is always within a single link from the originating DCR switch. For a Handicap One call, the destination DCR switch is two links from the originating DCR switch. For a Handicap Two call, there are more than two links between the originating and destination DCR switches. A Handicap Zero call is a one link routing scenario where an originating DCR switch attempts to route the call on the direct trunk group between the origination DCR switch and the destination DCR switch. If the direct trunk group is busy, the origination DCR switch tries to use the two link tandem route option recommended by network processor 16. If the two link tandem route option is not possible, the call is routed using a switch based fixed route list. If the switch based fixed route list does not provide an available transmission path, the call is blocked. A Handicap One call is a two link routing scenario where an originating DCR switch attempts to use the two link tandem route option recommended by network processor 16 because a direct link between the origination DCR switch and the destination DCR switch does not exist. If the two link tandem route option is not possible, the call is routed using the switch based fixed route list. If the switch based fixed route list does not produce an available route, the call is blocked. A Handicap Two call is a three link or more routing scenario where a call travels over a fixed route between the originating DCR switch and an intermediary DCR switch. The intermediary DCR switch then attempts to use the two link tandem route option recommended by network processor 16 because there is no direct trunk group between the intermediary DCR switch and the destination DCR switch. If the two link tandem route option is not possible, the call is routed using the switch based fixed route list. If the switch based fixed route list does not provide an available route, the call is blocked.

For each type of DCR call, there are certain rules that are placed on the call that limit the way each call will be routed. For a Handicap Zero call, the call will route via trunks determined from a destination node table in the originating DCR switch that corresponds to the destination DCR switch if the call is incoming on a DCR trunk. The call will be blocked if no circuits are available. If the call is incoming on a non-DCR trunk, the call will be routed via the direct trunks determined from the destination node table of the originating DCR switch that corresponds to the destination DCR switch. If none are available, one of three recommendations within the destination node table may be followed. A first recommendation may be to block the call. A second recommendation may be to attempt alternate routes found in the switch based fixed route list. If none are available, the call is blocked. A third recommendation may be to attempt tandem routes recommended by network processor 16 within the destination node table. If no tandem routes are available, alternate routes may be checked in the switch based fixed route list. If no alternate routes are available, the call is blocked. For a Handicap One call, the call will be routed based on recommendations provided by network processor 16 corresponding to the destination DCR switch and found within the destination node table of the originating DCR switch. These recommendations include blocking the call, using alternate routes in the switch based fixed route list, and attempting tandem routes as described in connection with a Handicap Zero call. For a Handicap Two call, the call will be routed to the next route in the switch based fixed route list until a circuit is available. If no circuit is available, the call will be blocked.

Figure 2:
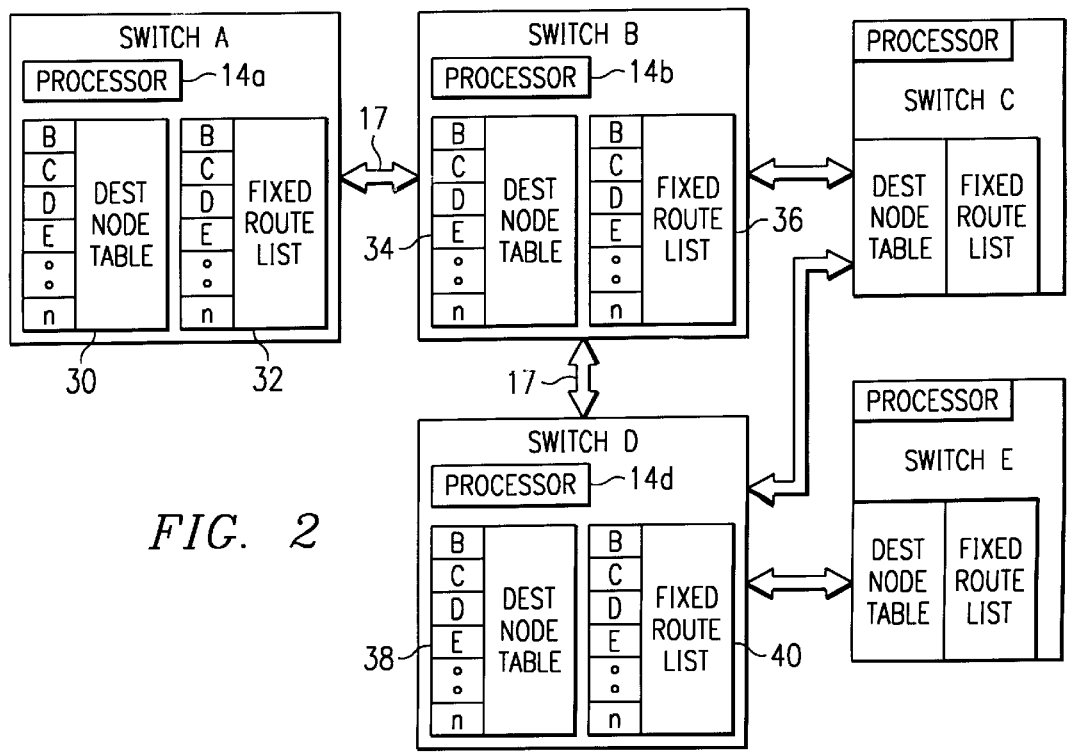
FIG. 2 is a block diagram illustrating a basic dynamically controlled routing process within the telecommunications network.

FIG. 2 shows an example of the basic dynamically controlled routing process. For a call originating at DCR switch A and destined for DCR switch C, DCR switch C is a Handicap One destination to DCR switch A. Since there are no direct trunk groups between DCR switch A and DCR switch C, DCR switch A will look to recommendations made by network processor 16 and within appropriate locations of destination node table 30 corresponding to DCR switch C for tandem routing to get to DCR switch C. The recommendation within destination table A is to use DCR switch B. The call will be forwarded to DCR switch B if there is an available direct trunk group between DCR switch A and DCR switch B. If no direct trunk group is available, DCR switch A accesses appropriate locations in switch fixed based fixed route list 32 corresponding to DCR switch B to attempt to forward the call to DCR switch B. If alternate routes are not available, the call is blocked.

If the call has been forwarded to DCR switch B, DCR switch C becomes a Handicap Zero destination to DCR switch B. DCR switch B will first try to route the call through a direct trunk group to DCR switch C. If no direct trunk group is available, DCR switch B will look to recommendations made by network processor 16 and within destination node table 34 for tandem routing to DCR switch C. If no tandem routes are available, DCR switch B will refer to switch based fixed route list 36 for alternate routes. If no alternate routes are available, the call is blocked.

For a call originating at DCR switch A and destined for DCR switch E, DCR switch E is a Handicap Two destination to DCR switch A. The call is fixed routed over a direct trunk group to DCR switch B. The call will be blocked if there is no available direct trunk group between DCR switch A and DCR switch B.

If the call proceeds to DCR switch B, DCR switch E becomes a Handicap One destination to DCR switch B. Since there are no direct trunk groups between DCR switch E and DCR switch B, DCR switch B accesses appropriate locations within destination node table 34 for tandem routing recommendations to DCR switch E as determined by network processor 16. If DCR switch D is the recommendation, the call is routed from DCR switch B to DCR switch D over an available direct trunk group. If a direct trunk group is not available, DCR switch B accesses appropriate locations within switch based fixed route list 36 for alternate routes. If there are no available alternate routes, then the call is blocked.

If the call proceeds to DCR switch D, DCR switch E is a Handicap Zero destination to DCR switch D. DCR switch D will first attempt to route the call over a direct trunk group to DCR switch E. If none is available, DCR switch D will access appropriate locations corresponding to DCR switch E in destination node table 38 for tandem routing recommendations to DCR switch E as determined by network processor 16. If tandem routes are not available, DCR switch D accesses appropriate locations corresponding to DCR switch E in switch based fixed route list 40 for alternate routing. If alternate routing is not available the call is blocked.

Telecommunications switch 12 may also operate in an anti-looping mode. The anti-looping mode is a switch based routing function that prevents calls from routing all over telecommunications network 10 in a dynamically controlled routing mode. Anti-looping takes effect when a destination DCR switch is the route choice of a sending DCR switch and the direct trunk groups between the sending DCR switch and the destination DCR switch are busy. In such a case, the sending DCR switch ignores any recommended tandem routing and proceeds to determination of alternate routes found within the switch based fixed route list. The call will be blocked if alternate routes are unavailable. Anti-looping is needed in the Handicap Zero destination scenario to prevent calls from being re-routed back through the network.

Telecommunications switch 12 may also operate in a dual homing mode. The dual homing mode is a switch based routing function which allows calls to be routed on a percentage basis for each country code. The dual homing mode is used for international called party destination numbers. The dual homing mode allows calls to be routed on a percentage basis, in one percent increments, to a virtual DCR switch. A virtual DCR switch consists of two physical DCR destination switches. The virtual DCR switch preferably contains eight direct trunk groups, the number of trunk groups to each physical DCR destination switch within a virtual DCR switch is flexible ranging from zero to eight. Existing routing mechanisms below the trunk group level stay the same. A virtual DCR switch is a non-communicating node with direct trunk groups to each physical DCR destination switch and cannot be recommended as a tandem routing recommendation by network processor 16. If a virtual DCR switch is recommended for tandem routing, such recommendation is ignored. Congestion and data reporting for a virtual DCR switch is the same as for the physical DCR destination switches. For each international call, the call is to be routed on a percentage basis to each of the two physical DCR destinations which are the virtual DCR switch for each country code. Calls are routed based on a route list in an international routing table in the physical DCR destination switches.

Figure 3:
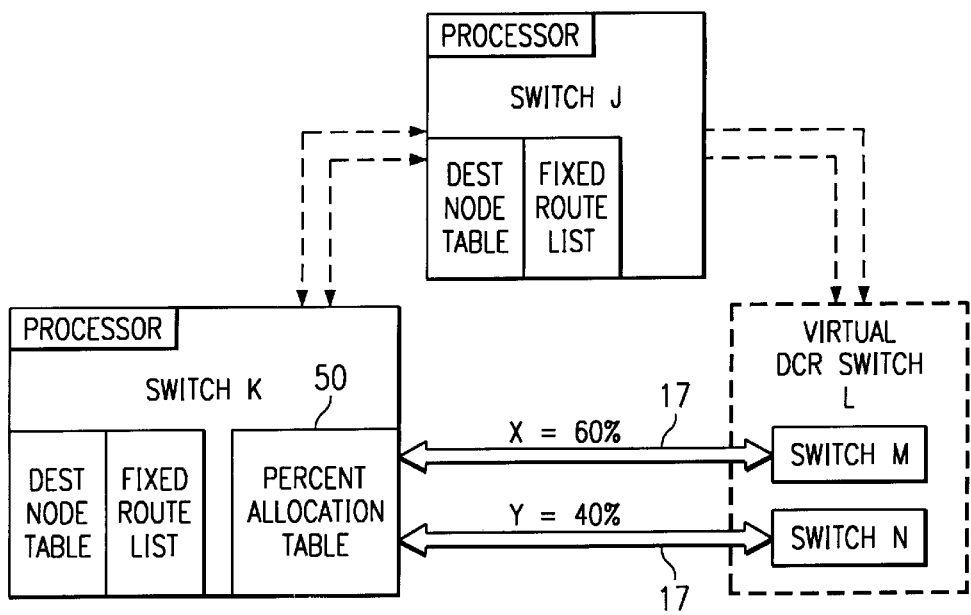
FIG. 3 is a block diagram illustrating a dual homing mode of the dynamically controlled routing process.

FIG. 3 shows an example of the dual homing mode of operation. The percentage allocation is defined by each country code. Each country code has its own x and y percentage parameters which define traffic allocation on a one percent basis. Originating DCR switch K transfers calls to virtual DCR switch L having physical DCR switches M and N. The percentage allocation of 60% for physical DCR switch M and 40% of physical DCR switch N is based on the country code involved as determined from a percent allocation table 50 within originating DCR switch K in order to distribute the outgoing traffic to physical DCR switches M and N. The percentage allocation shown may be different for other country codes and for changes in the percent allocation table 50 as made by network processor 16. The percentage allocation may also be adjusted in response to same direct trunk groups being busy and unavailable between originating DCR switch K and virtual DCR switch L. The international call may be tandem routed, for example through DCR switch J, only when all direct trunk groups between originating DCR switch K and virtual DCR switch L are busy and unavailable.

Network management control has priority over dynamically controlled routing. In order to provide this priority, network management procedure calls will be made from the dynamically controlled routing route selection algorithm. If a network management control is applied to a trunk and the call is blocked by that control, then dynamically controlled routing will take a back seat to the network management and the call will be blocked regardless of whether a tandem route is available for routing the call.

Figure 4:
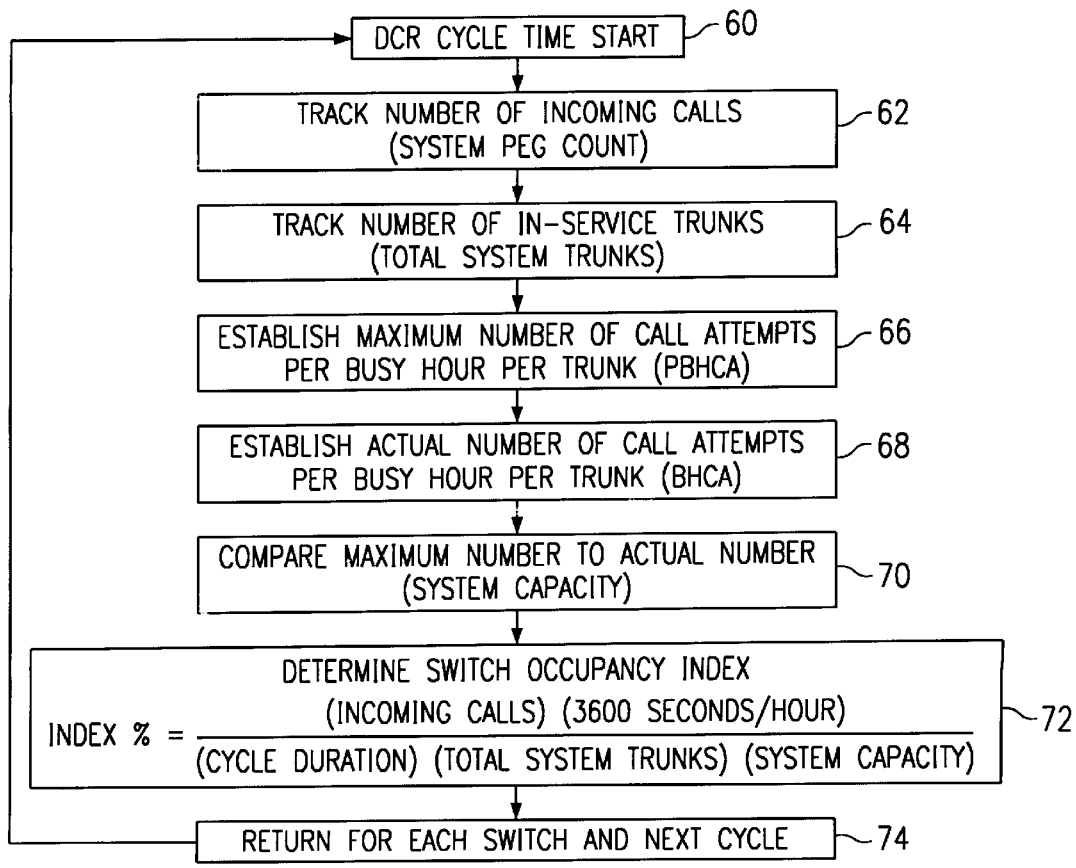
FIG. 4 is a flow chart outlining a method of calculating congestion data within a telecommunications switch of the telecommunications network.

FIG. 4 shows a flow chart outlining a method of calculating a form of congestion data within telecommunications switch 12. A more detailed description of this calculation can be found in copending U.S. application Ser. No. 08/724,791 which is hereby incorporated herein by reference.

Figure 5A:
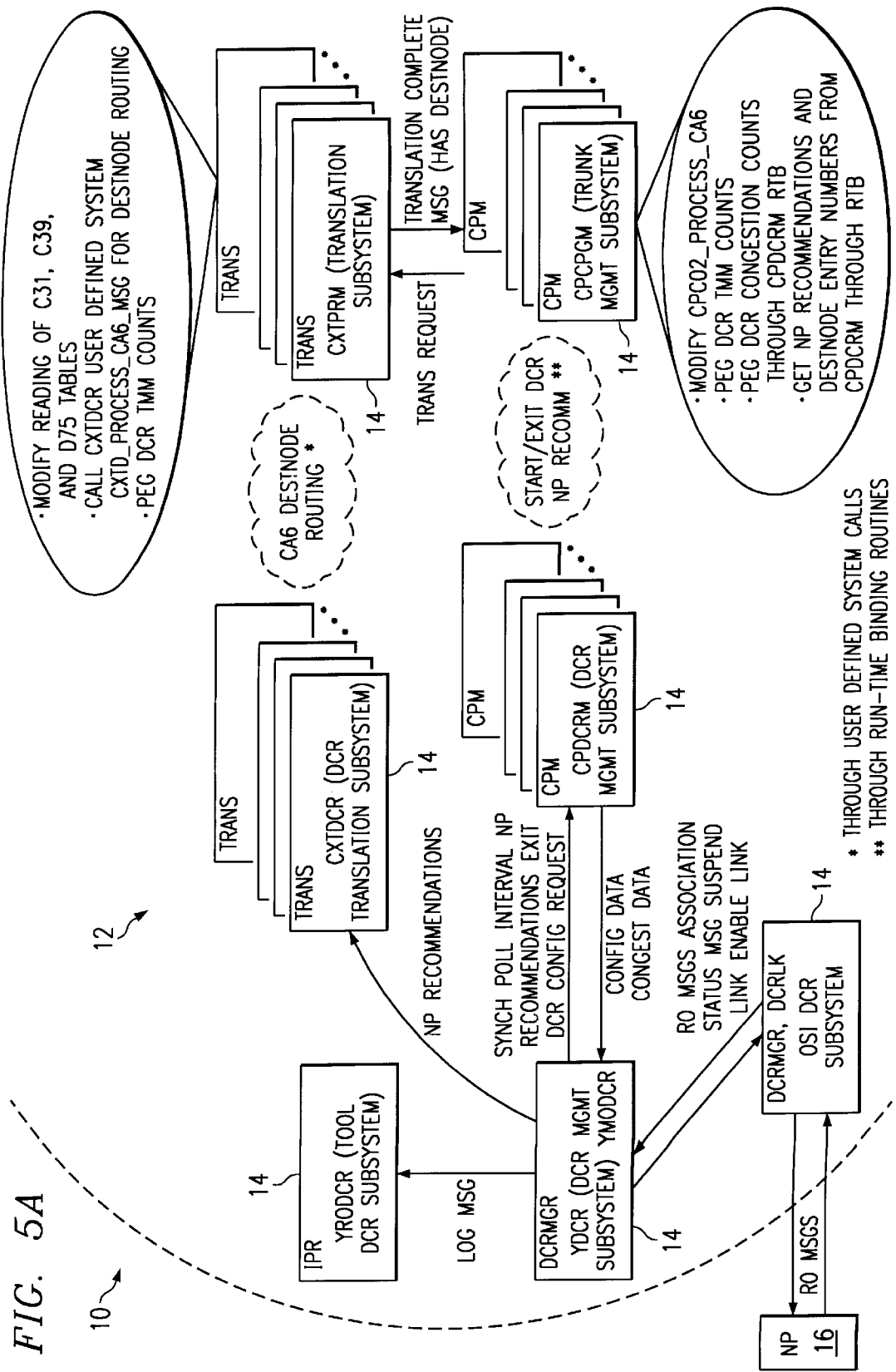
FIGS. 5A–B are block diagrams of call processing programs residing in processors of a telecommunications switching within the telecommunications network.
Figure 5B:
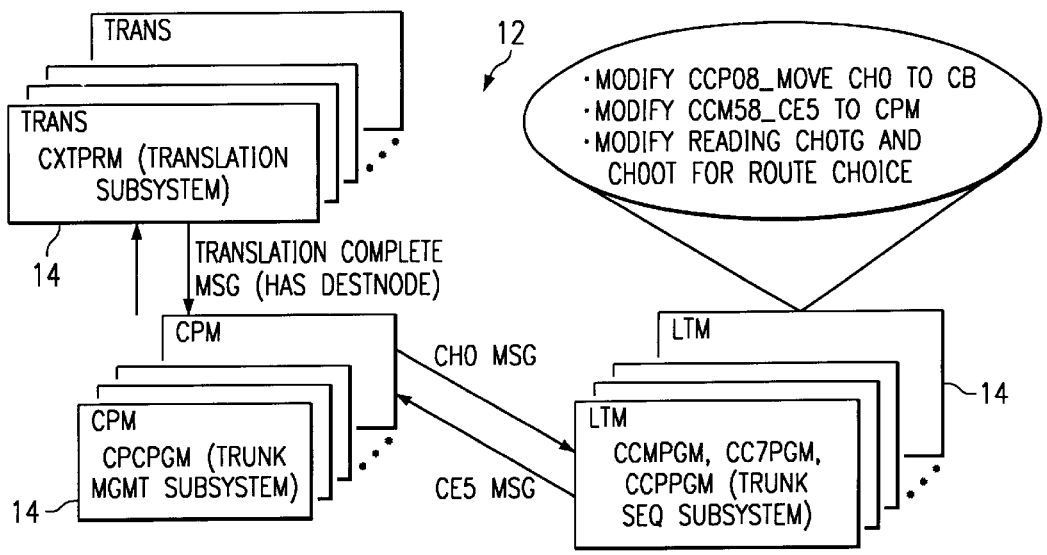

FIGS. 5A–B show block diagrams of the various call processing programs within each processor 14 of each telecommunications switch 12. Call processing programs within processors 14 of telecommunications switch 12 interact with other call processing programs within other processors of telecommunications switch 12 in order to perform dynamically controlled routing of all processors 14 distributed within telecommunications network 10. The call processing programs within processors 14 include DCR interface subsystem program open systems interconnection (OSI) performed on a DCR manager (DCRMGR) and a DCR link (DCRLK) processors, DCR management subsystem programs YMODCR and YDCR performed on DCRMGR processor and CPDCRM performed on call processing manager (CPM) processors, tool subsystem program YRODCR performed on information and problem report (IPR) processors, translation subsystem programs CXTDCR and CXTPRM performed on translation (TRANS) processors, trunk management subsystem program CPCPGM performed on CPM processors, and trunk sequencing subsystem programs CCNPGM, CC7PGM, and CCPPGM performed on line trunk manager (LTM) processors.

Program OSI supports communications between network processor 16 and telecommunications switch 12. In order to provide an availability communication path between network processor 16 and telecommunications switch 12, an active and standby link approach is adopted. The active link is the interface that is currently selected by network processor 16 for initializing and exchanging recommendation and congestion data with telecommunications switch 12. The standby link is the interface that is ready to take over the above task in the event of a failure in the active link. The standby link operates in two modes, a backup mode and a standby mode. In the backup mode, the standby link is defined as an alternate link between network processor 16 and telecommunications switch 12, but established at a minimal connection level. In the standby mode, the standby link is defined as an alternate link between network processor 16 and telecommunications switch 12 that can exchange initial network processor remote operations and is ready to take over the active link task in the event of a failure in the active link.

Telecommunications switch 12 is set up so that it will not lose more than one update cycle worth of data during transfer from the active link to the standby link. Network processor 16 will establish an active link to telecommunications switch 12 followed by the establishment of a standby link during logon sequencing. For a logout operation, the standby link is logged out before the active link. Program OSI includes processing functions performed on the DCRMGR and DCRLK processors. The DCRMGR processor provides for high level communication protocol programs and application programs. The DCRLK processor provides for low level communication protocol programs.

Communications between network processor 16 and telecommunications switch 12 is carried out by using a set of remote operations (RO). The following remote operations messages may be sent from network processor 16 to telecommunications switch 12.

1. NOSLOGON—this message is sent by network processor 16 to allocate resources for a DCR logon and exchange of remote operations. A request for this remote operation is used as a trigger to establish the DCR application. A switch session will remain open as long as the switch is participating in DCR. Elements for the request message include a protocol conversion, user ID, password, and profile. Network processor 16 may receive a response message from telecommunications switch 12 that includes a protocol version element and a network equipment element.

2. NOSLOGOUT—this message is sent by network processor 16 to terminate a previous logon operation. A request for this remote operation is used as a trigger to clear the DCR application.

3. NPINIT—this message is sent by network processor 16 to initialize telecommunications switch 12 for DCR operation and may be used for first initialization at system start up, to return telecommunications switch 12 to the DCR network, or for restart after a recovery. Telecommunications switch 12 will not participate in the DCR application until all necessary initialization data has been collected by network processor 16. Network processor 16 will await for a response from telecommunications switch 12. If no response is received after a desired period of time, network processor 16 will log off, log back on, and attempt to restart the initialization sequence. The NPINIT remote operation may include the following elements: switch number, switch type, poll interval, time out interval, network processor version number, network processor subversion number, network common language location identification, and DCR network type. The response from telecommunications switch 12 may include a switch name, a switch type, and the poll interval in order to verify the message was properly received.

4. NPDESTLISTREQ—this message is a request to telecommunications switch 12 to send the list of all DCR destinations for which routing recommendations have to be computed. All DCR destinations one or two links away (handicap H0 and H1) are reported. Network processor 16 expects to receive the switch name from telecommunications switch 12 which is used for security validation before starting to set up the network connectivity pattern. If a valid switch name is identified, then a switch number is designated. If telecommunications switch 12 does not respond within a predefined time interval, network processor 16 will log off, log back on, and attempt to restart the initialization sequence.

5. NPSWITCHNUMCONFIG—this message is used by network processor 16 to define a unique reference identification assigned by network processor 16 for its own reference for each telecommunications switch 12 identifier specified by the DCR destination list and to collect H0 configuration data from telecommunications switch 12. This message is preferably sent to telecommunications switch 12 after network processor 16 receives the switch destination list as part of initialization data from telecommunications switch 12. Telecommunications switch 12 uses this unique reference identification for sending congestion data to network processor 16. This remote operation message may include a set of switching number data for each neighbor DCR telecommunications switch 12 to include the switch name and a switch number. Network processor 16 expects to receive a set of N destination configuration data, where N is the total number of directly connected neighbor DCR switches to telecommunications switch 12, describing the connectivity between this switch and other switches in the DCR network. The destination configuration data includes a switch number and the connectivity for H0 destination switches.

6. NPENABLESWITCH—this message is sent by network processor 16 to telecommunications switch 12 in order to activate telecommunications switch 12 to take part in the DCR function. This message may also be used to resynchronize the sending of congestion data when telecommunications switch 12 is already participating in the DCR function. After the initialization sequence is completed, telecommunications switch 12 sends congestion data spontaneously to network processor 16 on a regular basis. Possible timing drifts could occur during periodic transfer of congestion data which could be rectified by network processor 16 by the resending of the NPENABLESWITCH message. Network processor 16 may also expect a response from telecommunications switch 12 within a predetermined time interval. If a response is not so received, network processor 16 may log off, log back on, and attempt to restart the initialization sequence.

7. NPCHANGESWITCHTYPE—this message is sent by network processor 16 to telecommunications switch 12 in order to change the switch type to fixed route, DCR non tandem, or DCR tandem. Preferably, telecommunications switch 12 is given one update cycle to respond to this message.

8. NPRECOMMENDATION—this message is sent by network processor 16 to indicate the recommended routes for tandem calls. A set of route data is sent containing a recommended tandem switch number for each destination switch number. The recommendation may contain a recommend to continue with fixed routing or a recommend to block the call. No response is expected for this message.

The following remote operations messages are sent from telecommunications switch 12 to network processor 16 in order to notify of any changes in network configuration or switch operation mode. Telecommunications switch 12 will discard any message received that is not a validly recognized remote operations message.

1. SWCONGESTDATA—this message is sent by telecommunications switch 12 to network processor 16 every update cycle. This message contains congestion data to allow network processor 16 to compute new routing recommendations. Elements for this message may include CPU usage, time stamp, and congestion data having a switch number idle trunk count, a number of overflow calls, and a number of incoming calls.

2. SWCHANGECONFIG—this message is sent by telecommunications switch 12 to network processor 16 whenever its network configuration has changed. A network configuration change may include a trunk group being added or removed or a trunk being added or removed from a trunk group. Elements within the message may include a switch number and its connectivity. Telecommunications switch 12 may be set up to revert back to the fixed routing function if a response is not received from network processor 16.

3. SWCHANGESWITCHTYPE—this message is sent by telecommunications switch 12 to network processor 16 in order to change a participating DCR switch type. This message is preferably used for telecommunications switch 12 having a switch type of DCR non-tandem or DCR tandem. Once again, telecommunications switch 12 may be set up to revert back to the fixed routing function if a response is not received from network processor 16.

4. SWDESTADD—this message is sent by telecommunications switch 12 to network processor 16 in order to add a new destination switch to the DCR network. The elements for this message include the name of the switch and the connectivity to the new switch. Telecommunications switch 12 may also expect a return response for this message and may revert back to the fixed routing function if a response is not received.

5. SWDESTDELETE—this message is sent by telecommunications switch 12 to network processor 16 to delete a destination switch from the DCR network. The message may include the name of the switch and the number of the switch to be deleted.

The DCRMGR and DCRLK processors transfer remote operations messages received from network processor 16 to a program YMODCR. Program YMODCR receives all remote operations messages from network processor 16 provides decoding from the transfer syntax before passing the message to program YDCR. All outgoing remote operations messages from program YDCR are encoded into their transfer syntax according to basic encoding rules by program YMODCR before transfer to network processor 16. If for any reason telecommunications switch 12 cannot communicate with network processor 16, program YMODCR informs program YDCR that the communication link is closed and program YDCR reverts call processing back to switch based fixed routing when a predetermined time out cycle expires. When communications have been reestablished, program YMODCR informs program YDCR that the communication link is open.

Program YDCR interfaces with program OSI through program YMODCR for the receipt and transfer of remote operations messages. Through remote operations messages, program YDCR sends destination node switch names in response to a destination list request message from network processor 16. Program YDCR compiles and sends configuration data to network processor 16 from destination node tables 30 within program CPDCRM of the CPM processors. Satellite connectivity is calculated by program YDCR and destination node entry numbers are remapped to network processor switch numbers before sending the configuration data to network processor 16. Network processor switch numbers are used for data exchange between telecommunications switch 12 and network processor 16. Upon receiving configuration data from network processor 16, program YDCR remaps the network processor switch number to a destination node entry number in order to update the destination node tables 30 within program CPDCRM.

Program YDCR also collects and sends trunk group head count data from program CPDCRM to network processor 16. Program YDCR remaps received routing recommendations from network processor 16 and sends the recommendations to program CPDCRM. Information and problem reports are issued by program YDCR for a variety of events which may include establishment and termination of the DCR function, change of link mode from active to standby or vice versa, change of switch type by network processor 16 to fixed routing, receiving an invalid routing recommendation, inability to send remote operations response messages in time, receipt of first valid network processor recommendations, detecting errors in remote operations messages, and losing more than one update cycle data during a link switch over operation into a link configuration.

Tool DCR subsystem program YRODCR in the IPR processor is used to support automatic testing of DCR features. Program YRODCR may be programmed to emulate a network processor for program debugging and system level traffic capacity testing. Call processing load conditions, network overload conditions, and node overload conditions may be simulated in order to test the DCR features of telecommunications switch 12. Tool DCR subsystem may also have the capability to display the data configuration of telecommunications switch 12, including CPU usage and its calculation parameters, switch number, route attempts counters, and congestion and trunk connectivity for each destination node. Program YRODCR stores the remote operations messages that occur between node processor 16 and telecommunications switch 12. Program YRODCR maintains log data for telecommunications switch 12.

The DCR management subsystem also includes a plurality of CPM processors wherein which the CPDCRM program resides. During DCR operation, the CPDCRM program sends congestion data to the YDCR program within the DCRMGR processor every update cycle. The functions of the CPDCRM program include calculating trunk group configuration data for all trunk groups under the control of this particular CPM processor, report the number of outgoing terrestrial trunks connected to neighbor switches, and report the number of two way terrestrial trunks connected to neighbor switches, all to the YDCR program. The CPDCRM program may also report the network management control to the YDCR program if so active on any included trunk group.

Initially, configuration data for all H0 destination nodes under DCR control is reported during the initialization sequence. Subsequently, any trunk group addition or deletion to or from the destination nodes is reported in a switch configuration change data remote operations message to the YDCR program. The CPDCRM program calculates all trunk group configuration data at processor initialization time, upon receipt of a configuration request message from the YDCR program, or upon detection of any trunk connectivity changes during DCR operation.

The CPDCRM program sends DCR destination nodes statistics collection control messages to the CPCPGM program within the trunk management system, gathered on a destination node basis. The CPCPGM program writes the statistics into a buffer in the CPDCRM program. The statistics that are maintained include the destination node switch number, number of idle outgoing/two way trunks to each DCR destination, number of overflow calls (i.e. originating calls that overflow the direct route and attempt the network processor route recommendations) to neighbor switches, and the number of DCR incoming calls from each connected telecommunication switch. The CPDCRM program receives the network processor recommendation message from the YDCR program and updates the destination node tables accordingly with the new network processor route recommendations.

The CPCPGM program of the trunk management subsystem is the main call processing program within telecommunications switch 12. The CPCPGM program pegs counters for DCR statistics kept on trunk groups and destination nodes for both congestion and traffic metering and measurement data. The CPCPGM program accesses the subsequent routing from the originating switch when no direct circuit is available in the first leg of the tandem recommendation or if a continue recommendation is encountered. Call blocking is provided if there is no direct route available at the originating switch, no route on the recommended node is available, and subsequent routes are busy or do not exist. Subsequent routing is accessed from the tandem point when a call is routed to a recommended tandem switch and no direct switch is available in the second leg of the two link path. Call blocking is provided at the tandem switch if no direct route is available and the subsequent routes are busy or do not exist.

Figure 6B:
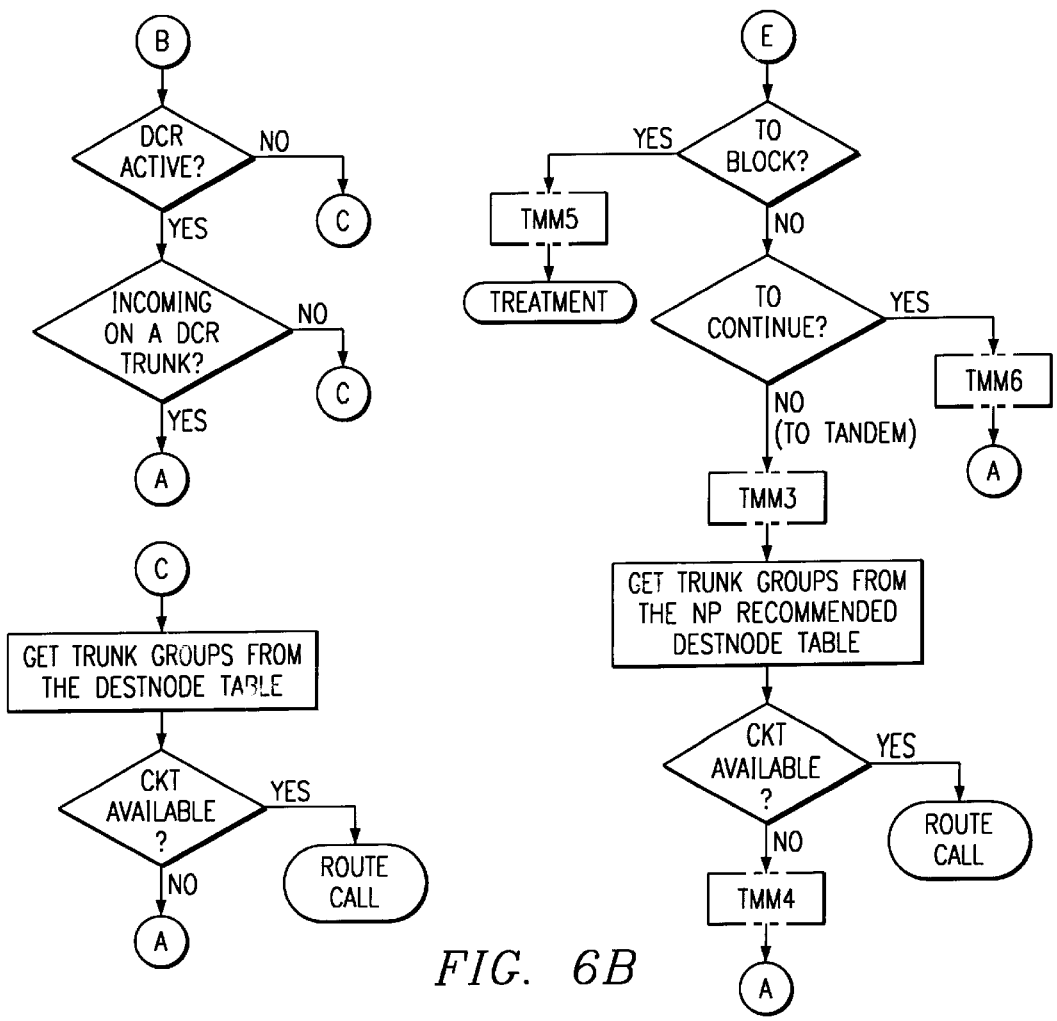
FIGS. 6A–B are flow charts illustrating a method of route selection performed by processors within the telecommunications switch.
Figure 6A:
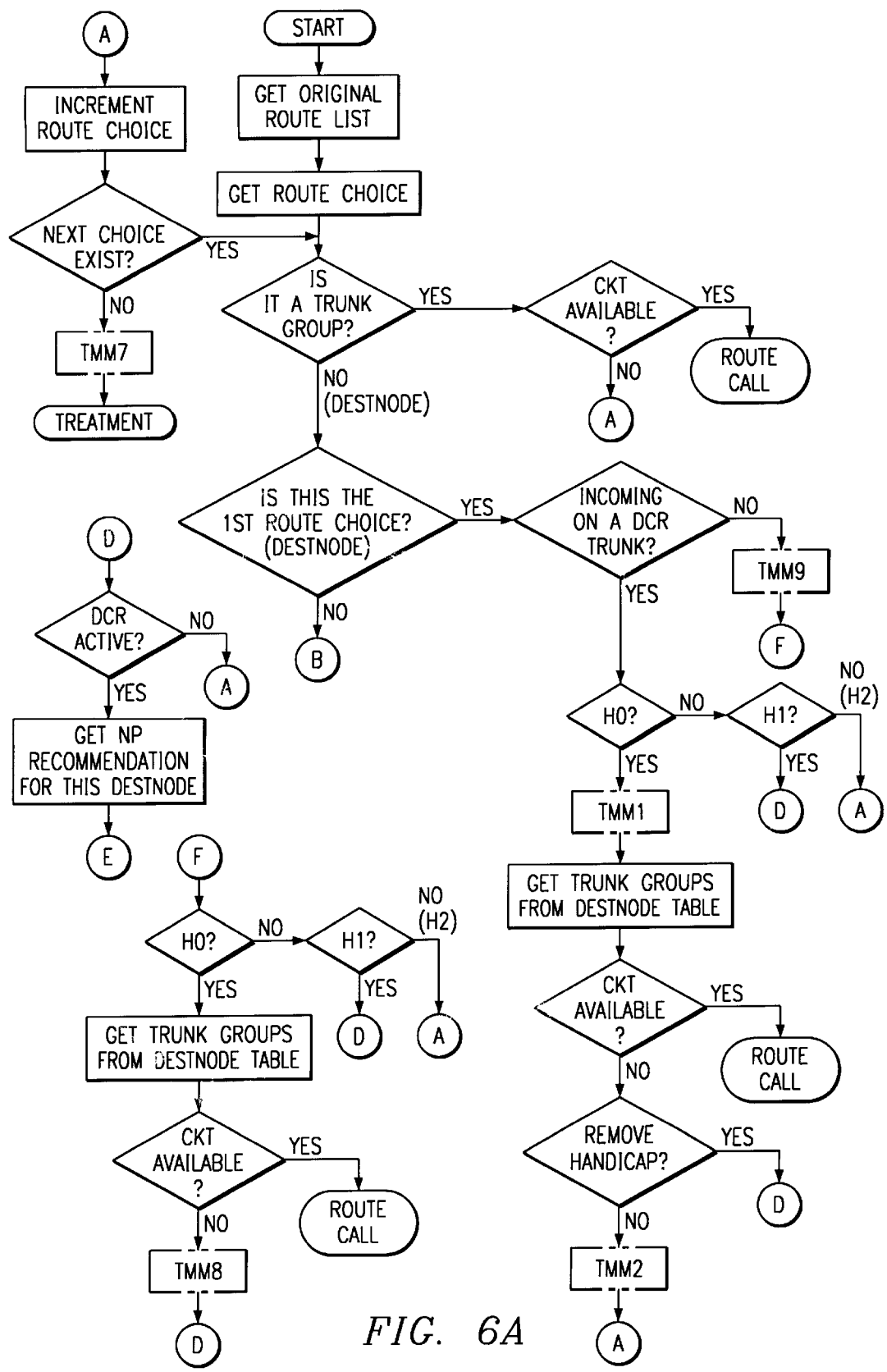

The CPCPGM program processes the route selection as previously described above. When processing a route selection, the CPCPGM program handles the network and antilooping logic as previously described. An example of a route selection algorithm is shown in FIGS. 6A–6B. When telecommunications switch 12 is in fixed route mode and the incoming call is on a DCR trunk, the table entry direct trunk groups are accessed to enact the antilooping feature. A network processor recommendation in the destination node table is only accessed during DCR operation. The network processor recommendation is used when there is an all trunks busy condition on all direct trunk groups, handicap type for the entry in the destination node table is zero, which is the first route choice in the route list, and the call is not incoming from DCR trunks.

The network processor recommendation is also used when the handicap type for the destination node table entry is H1 and it is the first route choice in the route list. For handicap H1 calls, if the route recommendation is all trunks busy, subsequent routing is used regardless of whether or not the incoming trunk group is a DCR trunk. If all trunks are busy on the direct trunks and the call is incoming from the DCR trunk, the call is routed through subsequent routes. If the subsequent routes are busy or if no entry exists in the subsequent route fields of a route list, the call is blocked. All calls that are blocked are sent on for appropriate treatment.

The translation subsystem includes translation processors within which the CXTPRM program resides. The CXTPRM program is the main translation call processing program within telecommunications switch 12. The CXTPRM program provides the call processing for various services including 800 service connections, international call types, and virtual private network call types. For example, the CXTPRM program in international call types constructs route list from the destination node tables and international direct distance dialing tables. The CXTPRM program handles the dual homing routing for these types of calls. Route attempts peg counts are created for each route index in the route list and traffic is distributed based on the percentage allocation and the current route attempts peg counts for the route index. In virtual private network call types, additional trunk groups are added to the route list for proper termination. The CXTPRM program sends its route list to the CPM processor for call termination.

Translation processors within translation subsystem also include the CXTDCR program. The CXTDCR program is the DCR translation program residing in the translation processor. The CXTDCR program receives network processor recommendation messages from the YDCR program within the DCRMGR processor. For calls that cannot reach the CPM processors that control the direct trunk groups of the H0 destination node route choices or when telecommunications switch 12 is in DCR mode for H1 routing, the network processor recommendation data within the CXTDCR program are used. In such a situation, the CXTDCR program will also handle the network antilooping function. Thus, the CXTDCR program is available to perform all functions of the CPDCRM program within the CPM processor when the CPM processors are not available to handle routing of the telecommunications traffic.

The CCMPGM, CC7PGM, and CCPPGM programs in the LTM processors of the trunk sequencing subsystem determine the allocation of line and trunk groups to terminate the call according to the routing recommendation.

As described, the dynamically controlled routing function is partitioned among and within many processors of each telecommunications switch 12. There is not one single processor doing everything to perform the DCR task, but tens to hundreds of processors working together and coordinating with each other to accomplish the DCR function. Each processor performs a unique and specific function that cumulatively provides a comprehensive DCR capability. Coordination is performed through interprocessor messaging such that processors can keep track of what other processors are doing.

Thus, it is apparent that there has been provided, in accordance with the present invention, a method of routing telecommunications signals in a telecommunications network that satisfies the advantages set forth above. Although the present invention has been described in detail, it should be understood that various changes, substitutions, and alterations may be made herein. For example, though discussed in terms of routing calls, the present invention may equally apply to the routing of telecommunications signals that may include voice, video, or data information. Other examples may be readily ascertainable by those skilled in the art and may be made herein without departing from the spirit and scope of the present invention as defined by the following claims.

What is claimed is:

1. A method of routing telecommunications signals in a telecommunications network, comprising steps of:
   receiving a plurality of dynamic routing recommendations;
   determining that telecommunications signals are to be transferred from a first switching element to a second switching element;
   identifying one of the plurality of dynamic routing recommendations to transfer the telecommunications signals from the first switching element to the second switching element;
   determining whether an anti-loop condition exists,
   bypassing the identified routing recommendation in favor of an alternate route in response to a presence of the anti-loop condition;
   transferring the telecommunications signals from the first switching element to the second switching element in response to the identified routing recommendation or the alternate route.

2. The method of claim 1, further comprising the step of:
   transferring the telecommunications signals from the first switching element to at least one intermediate switching element prior to transfer to the second switching element in accordance with the identified outing recommendation.

3. The method of claim 2, wherein the first switching element transfers the telecommunications signals to the second switching element through first and second intermediate elements, and further comprising the steps of:
   transferring the telecommunications signals to the first intermediate element from the first switching element over a fixed route direct trunk group;
   receiving a plurality of dynamic routing recommendations of the first intermediate switching element;
   identifying one of the plurality of dynamic routing recommendations of the first intermediate switching element; and
   transferring the telecommunications signals to the second switching element from the first intermediate switching element through the second intermediate element in response to the identified dynamic routing recommendation.

4. The method of claim 1, further comprising the step of:
   transferring the telecommunications signals from the first switching element to the intermediate switching element over an available direct trunk group.

5. The method of claim 1, further comprising the step of:
   transferring the telecommunications signals from the first switching element to the intermediate switching element based on an available alternate route in a fixed route list in the first switching element in response to a direct trunk group being unavailable.

6. The method of claim 1, further comprising the step of:
   blocking the transfer of the telecommunications signals in response to an alternate route being unavailable.

7. The method of claim 1, further comprising the step of:
   receiving updates to the plurality of dynamic routing recommendations in response to transferring of the telecommunications signals from the first switching element to the second switching element.

8. The method of claim 1, further comprising:
   determining an allocation of transfers made to the second switch;
   transferring the telecommunications signals to a third switch in response to the allocation.

* * * * *